(12) United States Patent
Wood

(10) Patent No.: US 11,325,673 B2
(45) Date of Patent: May 10, 2022

(54) POWER SENSING SYSTEM FOR BICYCLES

(71) Applicant: George Wood, New Taipei (TW)

(72) Inventor: George Wood, New Taipei (TW)

( * ) Notice: Subject to any disclaimer, the term of this patent is extended or adjusted under 35 U.S.C. 154(b) by 422 days.

(21) Appl. No.: 16/462,874

(22) PCT Filed: Nov. 30, 2016

(86) PCT No.: PCT/CN2016/107887
§ 371 (c)(1),
(2) Date: May 21, 2019

(87) PCT Pub. No.: WO2018/098655
PCT Pub. Date: Jun. 7, 2018

(65) Prior Publication Data
US 2020/0064212 A1    Feb. 27, 2020

(51) Int. Cl.
*B62J 45/414*    (2020.01)
*G01L 3/24*    (2006.01)
*G01L 5/00*    (2006.01)
*G01P 15/08*    (2006.01)
*G01P 15/14*    (2013.01)
*B62J 50/22*    (2020.01)

(52) U.S. Cl.
CPC ............. *B62J 45/414* (2020.02); *B62J 50/22* (2020.02); *G01L 3/24* (2013.01); *G01L 5/00* (2013.01); *G01P 15/0802* (2013.01); *G01P 15/14* (2013.01)

(58) Field of Classification Search
CPC .. B62J 99/00; B62J 45/40; B62M 6/45; G01L 3/24; G01L 5/00; G01P 15/0802; G01P 15/14

USPC ...................................................... 73/862.192
See application file for complete search history.

(56) References Cited

U.S. PATENT DOCUMENTS

| | | | | |
|---|---|---|---|---|
| 8,065,926 | B2 * | 11/2011 | Meyer | G01L 3/1471 |
| | | | | 73/862.338 |
| 9,075,076 | B2 * | 7/2015 | Baechler | B62J 99/00 |
| 10,156,582 | B2 * | 12/2018 | Liu | G01P 15/0802 |
| 10,900,986 | B2 * | 1/2021 | Nichols | B62M 1/36 |
| 2014/0297009 | A1 * | 10/2014 | Bass | B62J 99/00 |
| | | | | 700/91 |

FOREIGN PATENT DOCUMENTS

| CN | 104077795 | * 10/2014 |
|---|---|---|
| CN | 104670383 | * 6/2015 |

\* cited by examiner

*Primary Examiner* — Octavia Hollington
(74) *Attorney, Agent, or Firm* — Chun-Ming Shih; Lanway IPR Services

(57) ABSTRACT

A power sensing system for bicycles includes a power sensing device and an electronic carrier, wherein the power sensing device includes at least one inertial sensing module, a processing module and a transmission module, such that the inertial sensing module can transfer the digital signal change data measured by the power sensing device installed within the frame or on the surface of the frame of a bicycle to the processing module, and the processing module can calculate data by itself or otherwise transfer the data to the electronic carrier via the transmission module for calculations so as to calculate and analyze the pedaling frequency and the pedaling force during riding and then display and provide the real-time riding information on the electronic carrier.

8 Claims, 8 Drawing Sheets

POWER SENSING SYSTEM FOR BICYCLES

BACKGROUND OF THE INVENTION

1. Field of the Invention

The invention generally relates to a power sensing system for bicycles; in particular, it relates to a power sensing system installable into the inside, or alternatively onto the surface, of the frame of various types of bicycles, and allowing to analyze the real-time riding information during riding and display on an electronic carrier.

2. Description of Related Art

Currently available sensors utilized to measure pedaling force and pedaling efficiency are mostly placed on the main structure of the bicycle frame, e.g., installed on the pedal, bottom bracket (BB), chain-wheel, hub or crank, such that it is possible to, with the sensors of strain gauges or piezoelectric materials, directly measure the pedaling force or otherwise indirectly derive and calculate the pedaling force from the torque sensor. However, some issues do exist; for example, current sensor manufacture processes are still quite inconvenient, relevant installation procedures are pretty troublesome, such devices may not be universally applied to different types of bicycles, and the range of the sensor voltage output value may not be easily controlled.

From the perspective of mechanical operations, it is most desirable and most efficient if the crank can evenly apply forces in 360 degrees. But don't forget, we are humans, not machines, so the muscles of our legs are very familiar with the actions of stepping forwards and treading downwards, and they are also highly efficient. On the contrary, suppose you want to move your legs to pull backwards and lift upwards, these actions may make you feel uncomfortable and uneasy thus quickly leading to fatigue. It may be possible, after effective training, to apply the pedaling force of different power at different rotation phases so as to facilitate the most efficient pedaling action.

For example, generally speaking, when the crank is located at 90 degrees, i.e., at 3 o'clock direction, the direction of the tangential force assisting the crank to rotate will be perpendicular to the ground, indicating that the pedaling with force at this moment will offer the best benefit. Contrarily, at 270 degrees, i.e., at 9 o'clock direction, is it not only difficult to apply force, but the weight of the leg now has the greatest negative impact as well. Hence, in the pursuit of pedaling efficiency, it should be noted whether the maximum force application point is close to the 3 o'clock direction; but, when the pedaling action approaches to the 9 o'clock direction, it should allow the legs pass fast and smoothly. These two factors will greatly affect the pedaling efficiency.

Accordingly, it can be appreciated that, in case of using the sensor operating on pedaling force and pedaling efficiency to directly detect the pedaling force and the pedaling efficiency, the measurement results may be significantly affected by the human pedaling factor, and in addition to many issues like challenging installation processes, absence of universal applicability, not easily controlling the range of the voltage output value in the sensor, etc., it is obvious there is still much room for improvements with respect to the currently available techniques concerning directly sensing the pedaling force and the pedaling efficiency by means of the sensors operating on the pedaling force and the pedaling efficiency.

As a result, it is desirable to have a power sensing system for bicycles installable inside the bicycle frame or on the surface of the bicycle frame and including an inertial sensing module which can further enable many sensor functions, such as pedometer, power meter, etc., thereby reducing the costs and complexity for installing too many sensors, effectively lessening the weight of the bicycle without damaging the original frame design. Consequently, the present invention ought to be an optimal solution.

SUMMARY OF THE INVENTION

The objective of the present invention is to provide a power sensing system for bicycles, which can be installed into the inside, or onto the surface, of the frame of various types of bicycles, and allows to analyze in real-time the pedaling efficiency during riding by means of high capture frequencies and further display the computation results on an electronic carrier, thereby offering and showing the real-time riding information.

The power sensing system for bicycles of the present invention allows to measure the pedaling force from the both feet, and has the advantages of wide force measuring range, easy assembly, universal use for various brands and models, and light sensor weight, or the like.

To achieve the above-said objectives, the present invention discloses a power sensing system for bicycles, characterized in comprising:

a power sensing device, installed into the inside, or onto the surface, of the frame of a bicycle, and including:

at least one inertial sensing module, configured to detect the digital signal change data of the bicycle, and the digital signal change data includes the acceleration or angular acceleration waveforms for a continuous duration of time;

a processing module, electrically connected to the inertial sensing module so as to control the operations of the inertial sensing module, in which the inertial sensing module transfers the digital signal change data to the processing module which then, based on the received digital signal change data, calculates the pedaling frequency and the pedaling force during the operation of the bicycle, and in which the acquired pedaling frequency and the pedaling force are determined and analyzed by means of the acceleration peak and the angular acceleration peak in the acceleration or angular acceleration waveforms;

a transmission module, electrically connected to the processing module for transferring the results derived from the operations of the processing module; and an electronic carrier, capable of receiving the calculation results sent by the transmission module and displaying them in order to provide the real-time riding information.

Herein the processing module further includes a first analysis unit which captures the time between at least two acceleration or angular acceleration peaks in an acceleration or angular acceleration waveform over a period of time so as to calculate the pedaling frequency of the bicycle.

Herein the processing module further includes a second analysis unit which captures the peak value in an acceleration or angular acceleration waveform over a period of time so as to calculate the pedaling force value of the rider riding the bicycle.

Herein the electronic carrier is a handheld smart device, and the handheld smart device is provided with an application module which receives the calculated results transferred by the transmission module and displays on the application module in order to provide the real-time riding information by the application module.

Herein the inertial sensing module is an acceleration gauge or a gyroscope.

Herein the transmission module transfers the calculated results of the processing module by way of wired or wireless transmissions such that the electronic carrier can receive the calculated results transferred by the transmission module.

Moreover, the present invention also discloses a power sensing system for bicycles, characterized in comprising:

a power sensing device, installed onto the frame or the tire of a bicycle and including:

at least one inertial sensing module, configured to detect the digital signal change data of the bicycle, and the digital signal change data includes the acceleration or angular acceleration waveforms for a continuous duration of time;

a processing module, electrically connected to the inertial sensing module for controlling the operations of the inertial sensing module, wherein the at least one inertial sensing module can respectively transfer the digital signal change data to the processing module;

a transmission module, electrically connected to the processing module for transferring the digital signal change data received by the processing module; and an electronic carrier, applied to display and provide the real-time riding information and capable of receiving the digital signal change data transferred by the transmission module, and then, based on the received digital signal change data, calculating at least the pedaling frequency and the pedaling force during the operation of the bicycle, in which the acquired pedaling frequency and the pedaling force are determined and analyzed by means of the acceleration or angular acceleration peak in the acceleration or angular acceleration waveforms.

Herein the electronic carrier is a handheld smart device, and the handheld smart device is provided with an application module which receives the digital signal change data transferred by the transmission module and then, based on the received digital signal change data, calculates and displays the real-time riding information including at least the pedaling frequency and the pedaling force.

Herein the application module further includes a first analysis unit which captures the time between at least two acceleration or angular acceleration peaks in an acceleration or angular acceleration waveform over a period of time so as to calculate the pedaling frequency of the bicycle.

Herein the application module further includes a second analysis unit which captures the peak value in an acceleration or angular acceleration waveform over a period of time so as to calculate the pedaling force value of the rider riding the bicycle.

Herein the inertial sensing module is an acceleration gauge or a gyroscope.

Herein the transmission module transfers the digital signal change data received by the processing module by way of wired or wireless transmissions such that the electronic carrier can receive the digital signal change data transferred by the transmission module.

Through the aforementioned descriptions, the present invention can achieve the following technical effects:

(1) in addition to lessening the costs for installing excessively many sensors, the weight of the bicycle can be effectively reduced without destroying the original bicycle frame design;

(2) applicable to the inside of the frame of any type of bicycle or on the surface of the frame in order to analyze and calculate the pedaling efficiency during riding in a real-time approach, and further to provide and display the real-time riding information;

(3) capable of measuring the pedaling force from the both feet, as well as offering many advantages such as wide force measuring range, easy assembly, universal use for various brands and models, light sensor weight, and no need for startup voltage value corrections, etc.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
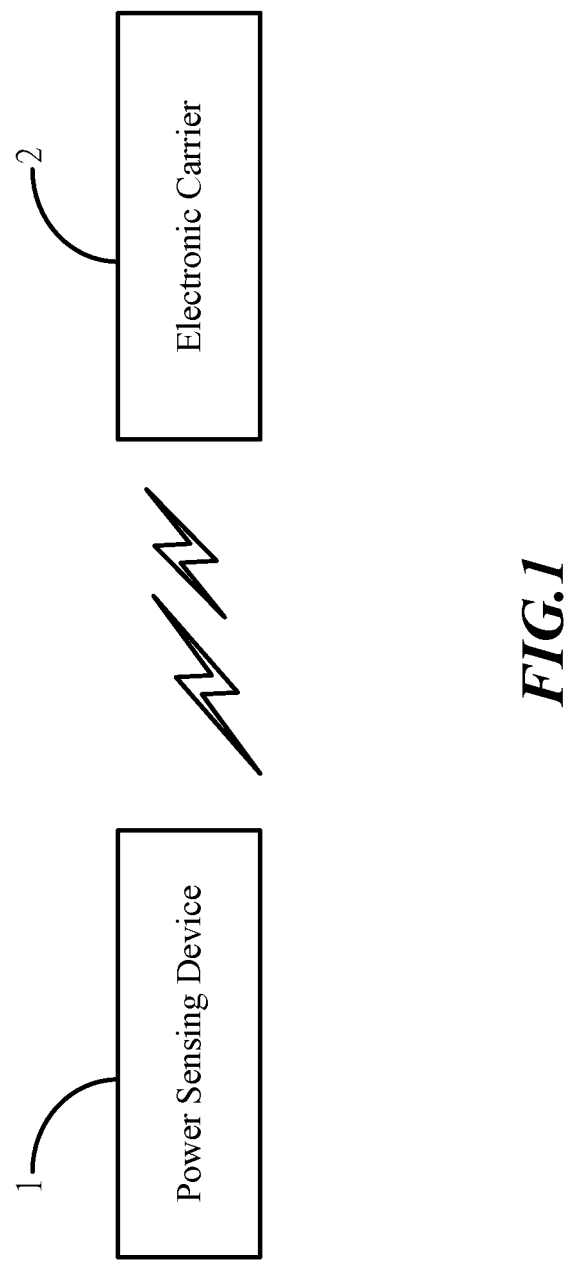
FIG. 1: an integral architecture view of the power sensing system for bicycles according to the present invention.
Figure 2:
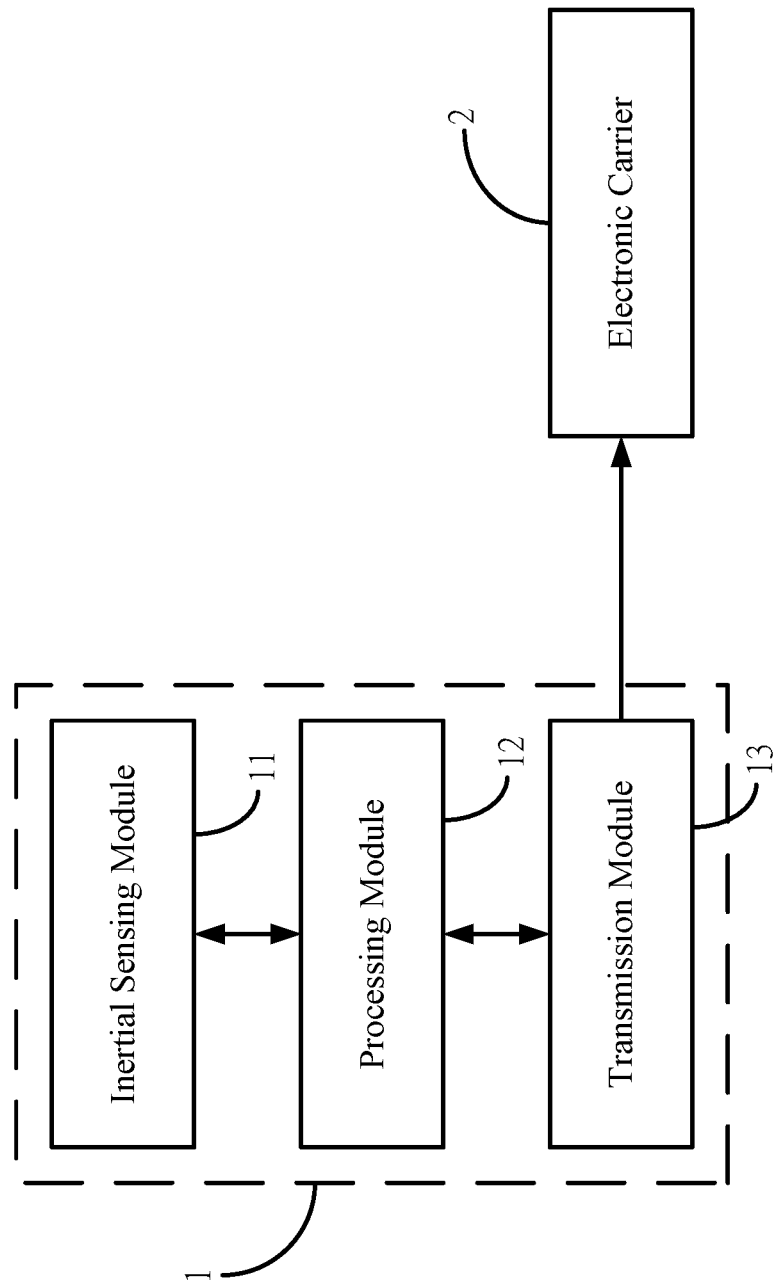
FIG. 2: an internal architecture view of the power sensing device in the power sensing system for bicycles according to the present invention.
Figure 3:
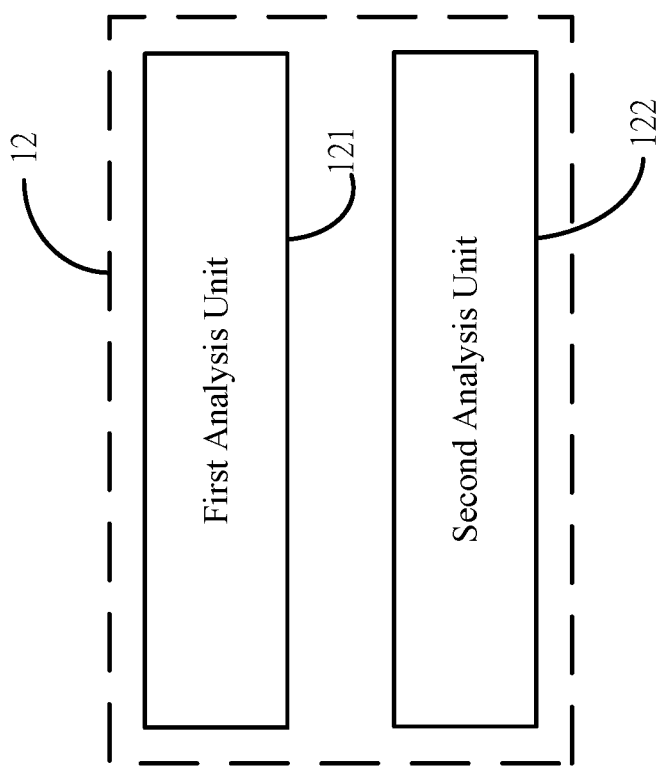
FIG. 3: an internal architecture view of the processing module in the power sensing device of the power sensing system for bicycles according to the present invention.

Refer first to FIGS. 1-3, wherein an integral architecture view, an internal architecture view of the power sensing device, as well as an internal architecture view of the processing module in the power sensing device, of the power sensing system for bicycles according to the present invention are respectively shown. It can be seen from the Figures that the power sensing system for bicycles comprises a power sensing device 1 and an electronic carrier 2, wherein the power sensing device 1 includes at least one inertial sensing module 11, a processing module 12 and a transmission module 13, and the at least one inertial sensing module 11 is applied to detect the digital signal change data of the bicycle, which digital signal change data including the acceleration or angular acceleration waveforms during a continuous duration of time.

Meanwhile, the processing module 12 is electrically connected to the inertial sensing module 11 for controlling the operations of the inertial sensing module 11, in which the inertial sensing module 11 transfers the digital signal change data to the processing module 12, and the processing module 12 further includes a first analysis unit 121 and a second analysis unit 122, such that the processing module 12 can then, based on the received digital signal change data, calculate the pedaling frequency and the pedaling force during the operation of the bicycle.

Herein the first analysis unit 121 captures the time between at least two acceleration or angular acceleration peaks in an acceleration or angular acceleration waveform over a period of time so as to calculate the pedaling frequency of the bicycle, and the second analysis unit 122 captures the peak value in an acceleration or angular acceleration waveform over a period of time so as to calculate the pedaling force value of the rider riding the bicycle.

After figuring out the pedaling frequency and the pedaling force, the processing module 12 further transfers the calculated results to an electronic carrier 2 via the transmission module 13 so that the electronic carrier 2 can display and provide the real-time riding information.

Figure 4:
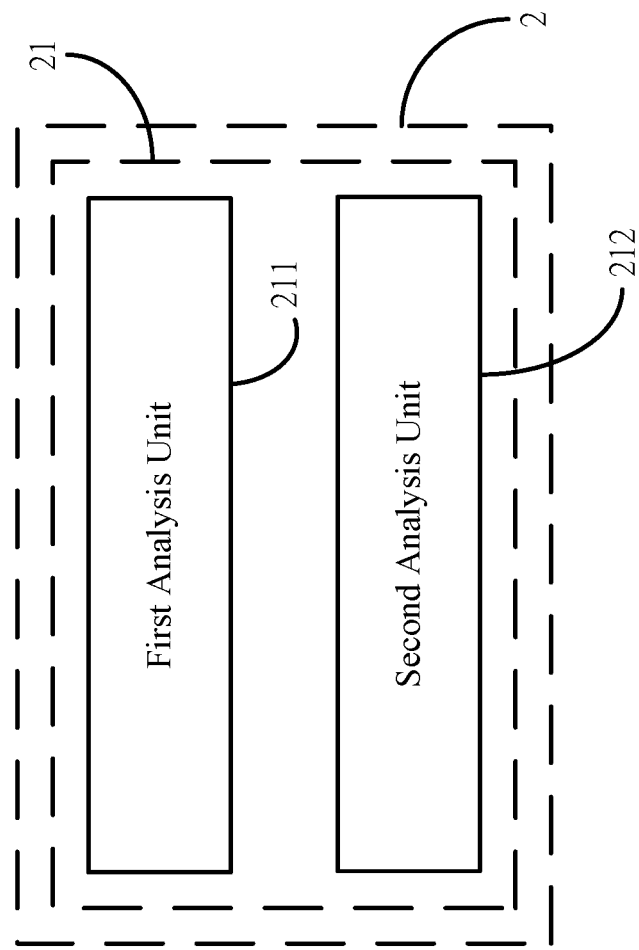
FIG. 4: an internal architecture view of the electronic carrier for another embodiment of the power sensing device in the power sensing system for bicycles according to the present invention.

Besides, the electronic carrier 2 can be a handheld smart device, and the handheld smart device may be provided with an application module 21 for displaying and providing the real-time riding information; however, as shown in FIG. 4, the application module 21 may be also configured with a first analysis unit 211 and a second analysis unit 212, both of which operate as previously described, thus illustrations thereof are herein omitted for brevity.

It can be seen that, if both of the processing module 12 and the application module 21 are able to calculate the pedaling frequency and the pedaling force, then the processing module 12 can autonomously choose to calculate the pedaling frequency and the pedaling force, or alternatively transfer the digital signal change information to the application module 21 to let the application module 21 perform the calculation tasks.

Or otherwise, if only the processing module 12 is able to calculate the pedaling frequency and the pedaling force, then the processing module 12 can first calculate the pedaling frequency and the pedaling force, and subsequently transfer the calculated results to the application module 21 for later operations.

Yet alternatively, if only the application module 21 is able to calculate the pedaling frequency and the pedaling force, then the processing module 12 can transfer the digital signal change information to the application module 21 which will subsequently perform the calculation operations.

Figure 5A:
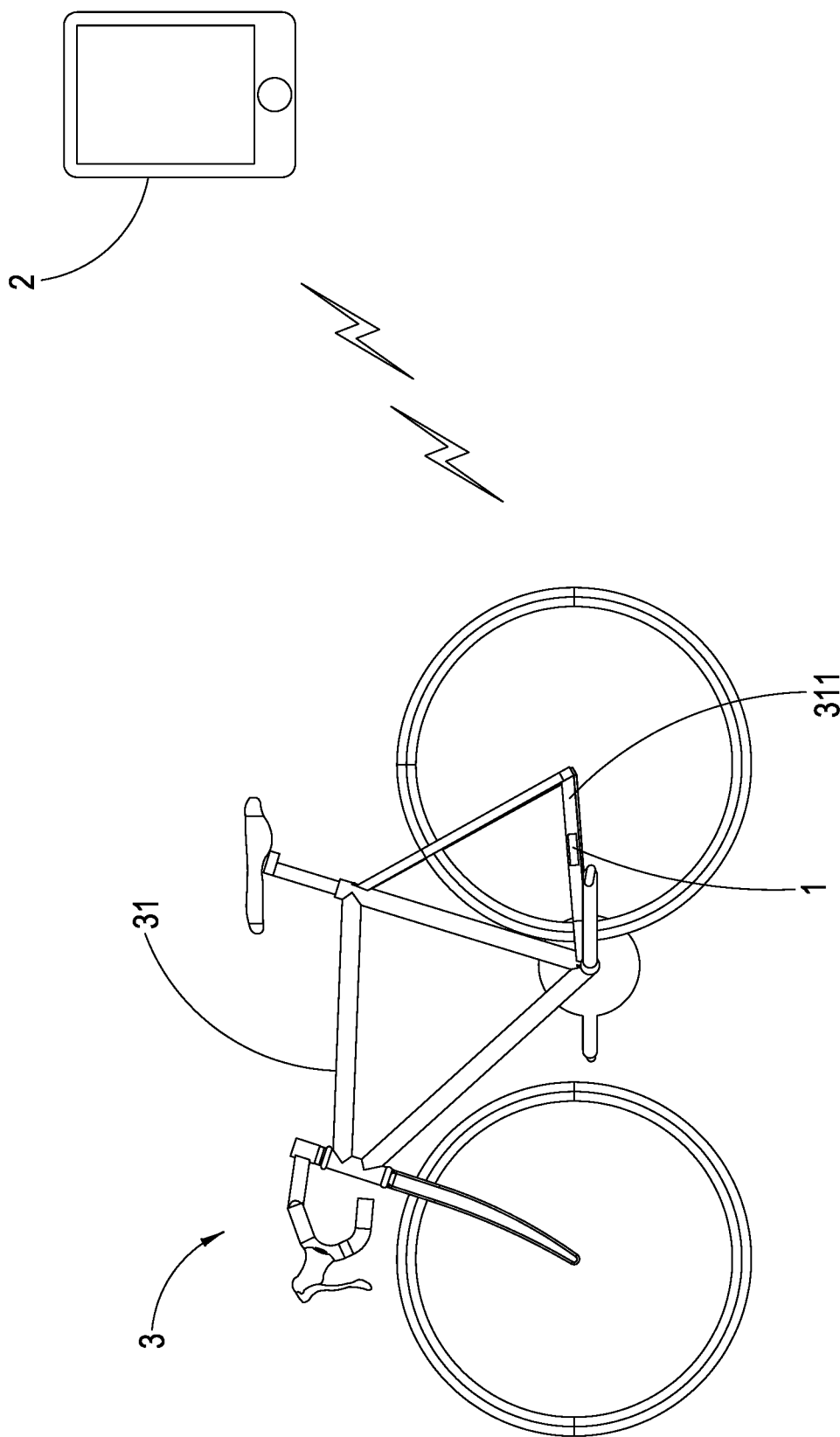
FIG. 5A: an application embodiment view of the power sensing device in the power sensing system for bicycles according to the present invention.
Figure 5B:
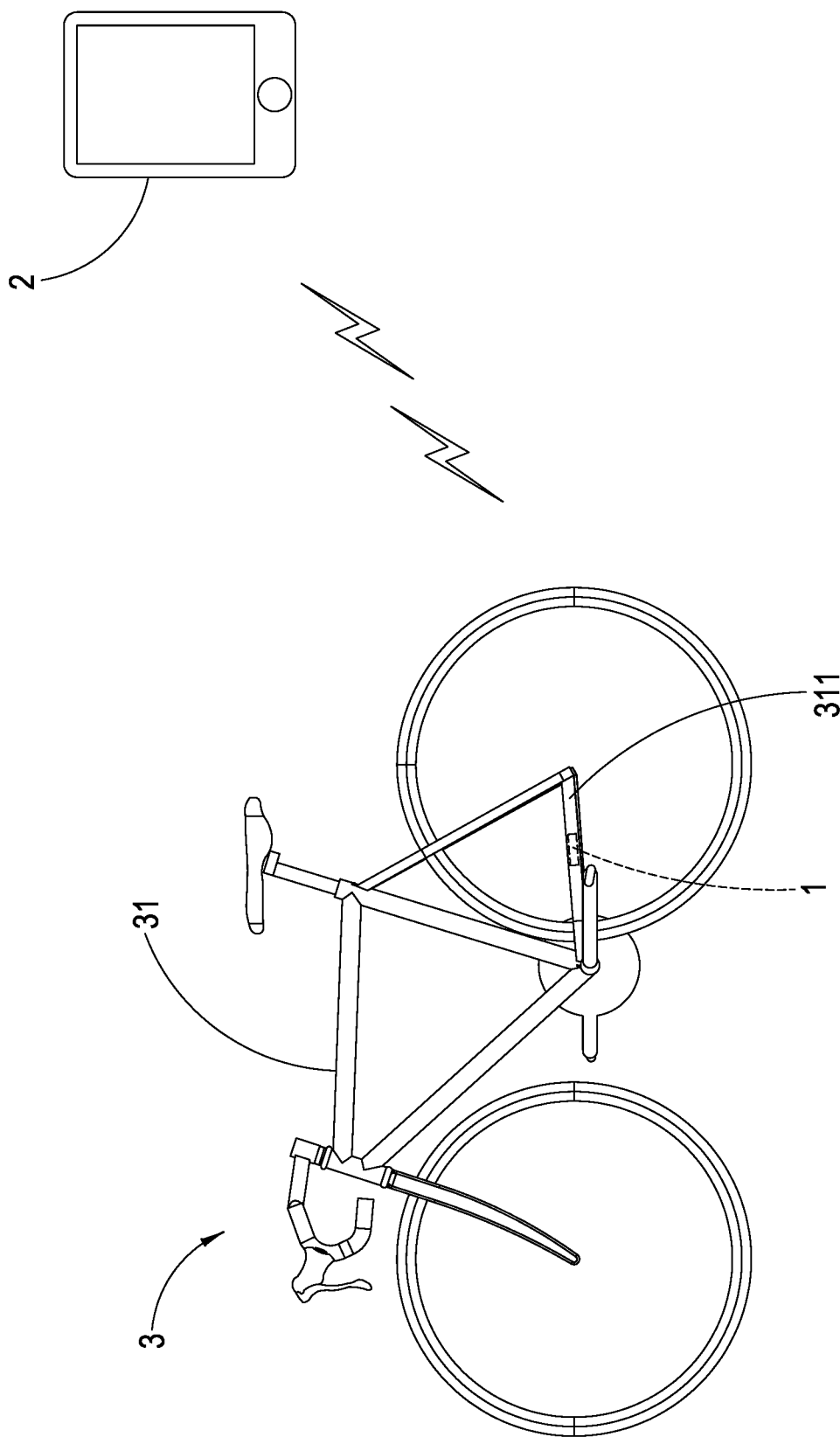
FIG. 5B: an application embodiment view of the power sensing device in the power sensing system for bicycles according to the present invention.
Figure 6A:
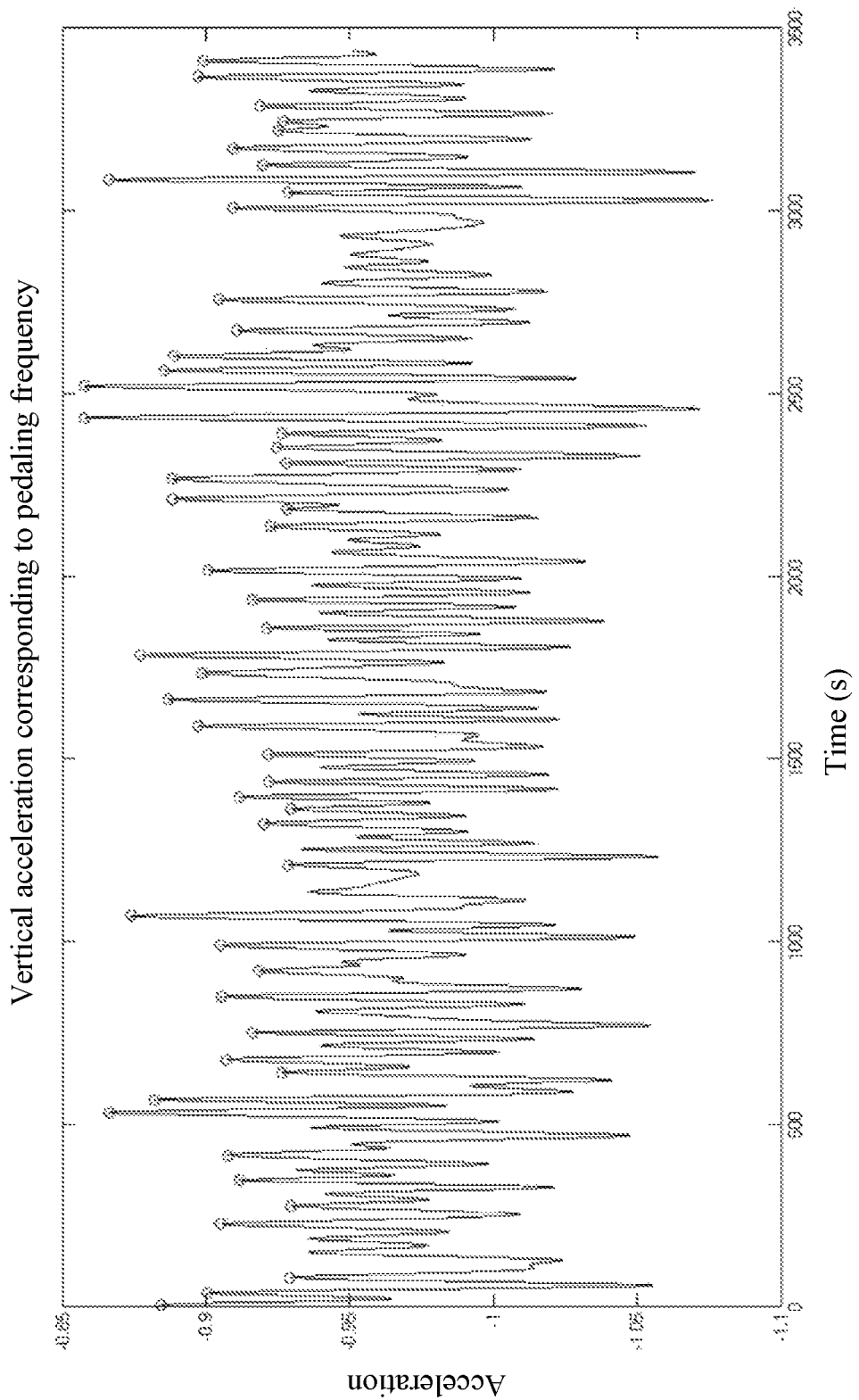
FIG. 6A: an acceleration or angular acceleration waveform diagram from the power sensing device in the power sensing system for bicycles according to the present invention.

Moreover, as shown in FIG. 5A or FIG. 5B, the power sensing device 1 is installed within the frame 31, or on the external surface thereof, of a bicycle (in the present embodiment, the power sensing device 1 is set up inside, or on the outer surface, of the lower fork portion 311 of the bicycle frame 31) thereby sensing and measuring to get the digital signal change data, wherein the digital signal change data includes the acceleration or angular acceleration waveforms for a continuous duration of time, as illustrated in FIG. 6A. It should be understood that the generation of acceleration or angular acceleration waveforms can be achieved because, during the travel of the bicycle 3, the inertial sensing module 11 can detect acceleration or angular acceleration data; however, since the inertial sensing module 11 can be an accelerometer or a gyroscope, the approach may vary; i.e., when applying an accelerometer, it calculates the pedaling frequency by using the time of the peak-to-peak values in the acceleration, and calculates the pedaling force by figuring out the amounts of peak-to-valley variations. On the other hand, in case of utilizing a gyroscope, the pedaling frequency is acquired by using the time of peak-to-peak values in the angular acceleration, and the pedaling force can be obtained by calculating the amounts of peak-to-valley variations.

From FIG. 6A, it can be seen that, by using an accelerometer as the inertial sensing module 11, a plurality of acceleration peak values (or otherwise angular acceleration waveforms upon applying a gyroscope) can be detected, wherein one acceleration peak value indicates one pedaling, and the time between two peak values is expressed as "at", the pedaling frequency, CAD, can be calculated via the equation: (60*k)/at; herein the adjustment coefficient k may be modified for different environments such as indoor and outdoor condition or riding status (filtered state). In addition, the unit for the resulted pedaling frequencies is RPM (i.e., Rotation Per Minute, where 60 is the unit conversion coefficient, meaning a conversion coefficient from number of rotations per second to number of rotations per minute.)

Figure 6B:
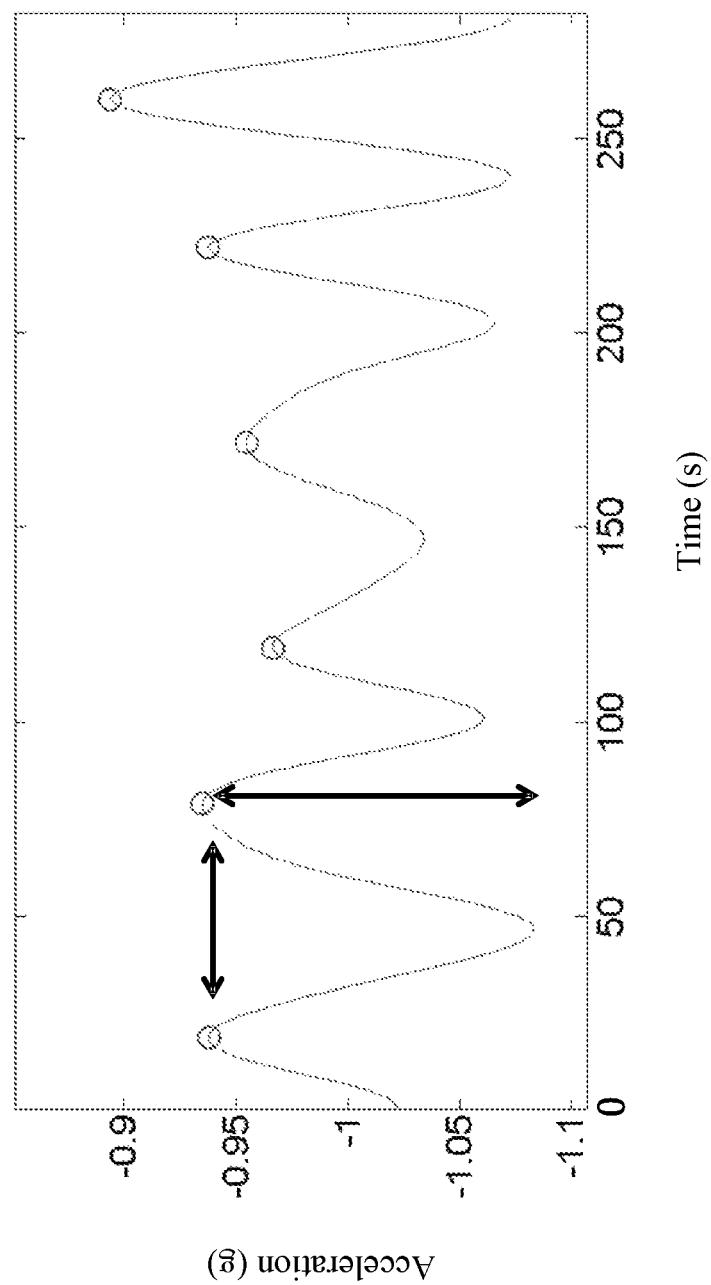
FIG. 6B: an inertial sensing analysis diagram from the power sensing device in the power sensing system for bicycles according to the present invention.

Seeing that the present application calculates the pedaling force by using the amplitude and calculates the pedaling frequency by using the peak-to-peak values, as shown in FIG. 6B, the acceleration waveform can be amplified in order to indicate the positions of the acceleration peaks. Moreover, since each of the acceleration or angular acceleration peaks (maximum) will correspond to different acceleration values, the acceleration variation value (i.e., the maximum acceleration value–the minimum acceleration value) corresponding to the peak value of all accelerations (or angular accelerations) in the acceleration (or angular acceleration) waveform during a certain period of time can be used as the calculation basis for figuring out the pedaling force exerted by the rider of the bicycle during riding; the actual pedaling force equation can be: $F = k \times \Delta a + R$, where F indicates the pedaling force, k the correction value constant (its unit is g value), $\Delta a$ the acceleration variation value (i.e., the maximum acceleration value–the minimum acceleration value), and R the correction value constant. Therefore, after calculating the change of each acceleration peak (maximum acceleration value–minimum acceleration value) over a period of time, the actual pedaling force can be obtained through the above-said formula.

As such, in comparison with other conventional technologies, the power sensing system for bicycles according to the present invention provides the following advantages:

(1) The present invention provides a power sensing system for bicycles installable inside the bicycle frame or on the surface of the bicycle frame and comprising an inertial sensing module, wherein the inertial sensing module can integrally operate to acquire the speed of the bicycle through multiple parameters and further enable many sensor functions, such as pedometer, power meter, etc., thereby reducing the costs and complexity for installing too many sensors, effectively lessening the weight of the bicycle without damaging the original frame design.

(2) The present invention can be installed into the inside, or onto the surface, of the frame of various types of bicycles, enabling data captures at high capture frequencies, allowing to analyze and calculate in real-time the pedaling efficiency during riding based on the obtained waveform variations and altitude changes, and further displaying the computation results on an electronic carrier, thereby offering and showing the real-time riding information.

(3) The present invention is able to measure the pedaling force from the both feet, as well as offer many advantages such as wide force measuring range, easy assembly, universal use for various brands and models, light sensor weight, and no need for startup voltage value corrections, etc.

It should be noticed that, although the present invention has been disclosed through the detailed descriptions of the aforementioned embodiments, such illustrations are by no means used to restrict the scope of the present invention; that is, those skilled ones in relevant fields of the present invention can certainly devise any applicable alterations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A power sensing system for bicycles, comprising:
a power sensing device, installed into an interior, or onto a surface, of a frame of a bicycle, and including:
at least one inertial sensing module, configured to detect a digital signal change data of the bicycle, and the digital signal change data includes acceleration or angular acceleration waveforms for a continuous duration of time;
a processing module, electrically connected to the inertial sensing module so as to control operations of the inertial sensing module, in which the inertial sensing module transfers the digital signal change data to the processing module which then, based on the received digital signal change data, calculates a pedaling frequency and a pedaling force during the operation of the bicycle, and in which the acquired pedaling frequency and the pedaling force are determined and analyzed by means of acceleration peaks or angular acceleration peaks in the acceleration or angular acceleration waveforms, the processing module further includes a first analysis unit which captures the time between at least two acceleration or angular acceleration peaks in an acceleration or angular acceleration waveform over a period of time so as to calculate the pedaling frequency of the bicycle, the processing module further includes a second analysis unit which captures peak values in an acceleration or angular acceleration waveform over a period of time so as to calculate the pedaling force of a rider riding the bicycle;
a transmission module, electrically connected to the processing module for transferring calculation results derived from the operations of the processing module; and
an electronic carrier, capable of receiving the calculation results sent by the transmission module and displaying them in order to provide real-time riding information.

2. The power sensing system for bicycles according to claim 1, wherein the electronic carrier is a handheld smart device, and the handheld smart device is provided with an application module which receives the calculation results transferred by the transmission module and displays on the application module in order to provide the real-time riding information by the application module.

3. The power sensing system for bicycles according to claim 1, wherein the inertial sensing module is an acceleration gauge or a gyroscope.

4. The power sensing system for bicycles according to claim 1, wherein the transmission module transfers the calculation results of the processing module by way of wired or wireless transmissions such that the electronic carrier can receive the calculation results transferred by the transmission module.

5. A power sensing system for bicycles, comprising:
a power sensing device, installed onto a frame of a bicycle and including:
at least one inertial sensing module, configured to detect a digital signal change data of the bicycle, and the digital signal change data includes acceleration or angular acceleration waveforms for a continuous duration of time;
a processing module, electrically connected to the inertial sensing module for controlling operations of the inertial sensing module, wherein the at least one inertial sensing module can respectively transfer the digital signal change data to the processing module, an application module further internally includes a first analysis unit which captures the time between at least two acceleration or angular acceleration peaks in an acceleration or angular acceleration waveform over a period of time so as to calculate a pedaling frequency of the bicycle, the application module further internally includes a second analysis unit which captures peak values in an acceleration or angular acceleration waveform over a period of time so as to calculate a pedaling force of a rider riding the bicycle;
a transmission module, electrically connected to the processing module for transferring the digital signal change data received by the processing module; and
an electronic carrier, applied to display and provide a real-time riding information and capable of receiving the digital signal change data transferred by the transmission module, and then, based on the received digital signal change data, calculating at least the pedaling frequency and the pedaling force during the operation of the bicycle, in which the acquired pedaling frequency and the pedaling force are determined and analyzed by means of the acceleration or angular acceleration peak in the acceleration or angular acceleration waveforms.

6. The power sensing system for bicycles according to claim 5, characterized in that, the electronic carrier is a handheld smart device, and the handheld smart device is provided with the application module which receives the digital signal change data transferred by the transmission module and then, based on the received digital signal change data, calculates and displays the real-time riding information including at least the pedaling frequency and the pedaling force.

7. The power sensing system for bicycles according to claim 5, characterized in that, the inertial sensing module is an acceleration gauge or a gyroscope.

8. The power sensing system for bicycles according to claim 5, characterized in that, the transmission module transfers the digital signal change data received by the processing module by way of wired or wireless transmissions such that the electronic carrier can receive the digital signal change data transferred by the transmission module.

* * * * *